ically expandable ring, which is retained in a groove in the inner cylindrical portion and biased radially outward by flat springs. The segments are prevented from moving circumferentially by U-shaped blocks, which engage the mid portion of the arcuate segment and are fastened to the inner cylindrical portion of the turbine.

United States Patent [19]
Daniels

[11] 3,768,817
[45] Oct. 30, 1973

[54] STATIC SEAL FOR A GAS TURBINE
[75] Inventor: Louis C. Daniels, Media, Pa.
[73] Assignee: Westinghouse Electric Corporation, Pittsburgh, Pa.
[22] Filed: Apr. 27, 1972
[21] Appl. No.: 248,178

[52] U.S. Cl................ 277/136, 60/39.66, 277/148, 415/117
[51] Int. Cl.............................................. F16j 9/24
[58] Field of Search................... 277/136, 146, 148, 277/149, 150; 60/39.66; 415/117, 113

[56] References Cited
UNITED STATES PATENTS
| | | | |
|---|---|---|---|
| 1,041,534 | 10/1912 | Wagner | 277/136 |
| 1,277,291 | 8/1918 | Canfield | 277/136 |
| 1,339,297 | 5/1920 | Spicer | 277/136 |
| 2,584,899 | 2/1952 | McLeod | 415/117 |
| 3,408,048 | 10/1968 | Scalzo | 415/113 |
| 2,465,415 | 3/1949 | Aragones | 277/136 |

Primary Examiner—Samuel B. Rothberg
Assistant Examiner—Robert I. Smith
Attorney—A. T. Stratton et al.

[57] ABSTRACT

A static seal is formed between adjacent concentric cylindrical portions of a gas turbine by utilizing a plurality of arcuate segments, which form a circumferentially expandable ring, which is retained in a groove in the inner cylindrical portion and biased radially outward by flat springs. The segments are prevented from moving circumferentially by U-shaped blocks, which engage the mid portion of the arcuate segment and are fastened to the inner cylindrical portion of the turbine.

7 Claims, 5 Drawing Figures

STATIC SEAL FOR A GAS TURBINE

BACKGROUND OF THE INVENTION

This invention relates to gas turbines and more particularly to a high temperature static seal for a gas turbine.

In axial flow gas turbines, a static seal is provided at the blade entrance by an adjustable seal ring, which cooperates within a shroud for the first row of stationary vanes or blades to prevent the hot elastic motive fluid from by-passing the vanes. Such seals are subjected to very high temperatures and must be adapted to accommodate eccentricity and out of roundness of the adjacent parts and allow for axial and radial thermal differential expansion and contraction. Because of the severe operating conditions, such seals must be simple, have as few parts as possible and the parts must be disposed to prevent them from becoming disengaged and damaging the turbine.

SUMMARY OF THE INVENTION

In general, a static seal for controlling the leakage of fluid between high and low pressure portions of an elastic fluid machine, when made in accordance with this invention, comprises a portion having a generally cylindrical surface, a plurality of arcuate segments cooperatively associated to form a circumferentially adjustable ring, a circumferential groove adapted to receive and retain the arcuate segments, leaf springs associated with each arcuate segment and so disposed to bias the arcuate segment in a radial direction away from the bottom of the circumferential groove, and a holding block and fastening means for each arcuate segment. The holding blocks are adapted to hold the arcuate segments and leaf springs in a fixed circumferential position with respect to the circumferential groove and to allow the arcuate segments to move radially to permit the segments to contact the cylindrical surface and form a high temperature seals therebetween.

BRIEF DESCRIPTION OF THE DRAWINGS

The objects and advantages of this invention will become more apparent from reading the following detailed description in connection with the accompanying drawings, in which.

DESCRIPTION OF THE PREFERRED EMBODIMENT

Figure 1:
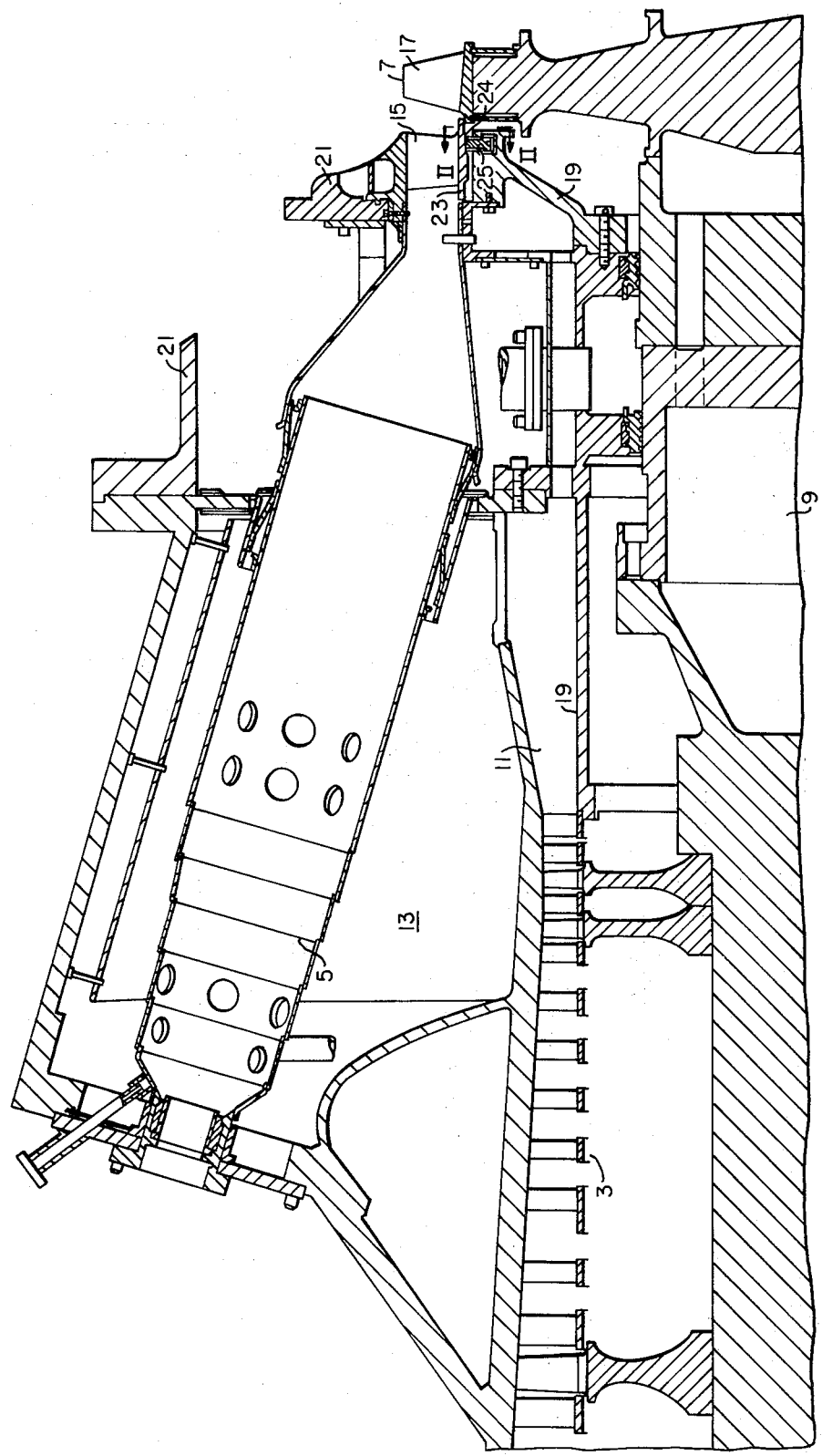
FIG. 1 is a partial sectional view of a gas turbine incorporating a static seal made in accordance with this invention.

Referring now to FIG. 1 in detail, there is shown an axial flow gas turbine 1 having a compressor portion 3, a plurality of combustion chambers or combustors 5 (only one is shown), and a turbine portion 7 connected on a single rotor or shaft 9 with the compressor 3.

Combustion air is compressed in the compressor 3 and flows through a diffuser 11 into a plenum chamber 13, which encircles the combustion chambers 5 and a portion of the rotor 9 and the compressor 3. The plenum chamber 13 is in fluid communication with the combustion chambers 5 supplying them with primary and secondary air. The primary air is mixed with a fuel, ignited and burned, and is then mixed with secondary air to produce the motive fluid which is directed by an annular array of stator nozzles or vanes 15 against an annular array of rotating blades 17 which cooperate to convert the heat energy in the motive fluid to mechanical rotating energy. The construction of the plenum chamber 13 is such that a torque tube or inner cylinder 19 is disposed around the rotor 9 forming an inner wall of the plenum chamber 13. A casing or outer cylindrcal wall 21 encircles the outer periphery of the plenum chamber and the stator vanes 15 are fastened to the casing 21. The vanes 15 are joined by an inner shroud ring 23, which forms a cylindrical surface 24 concentric with and adjacent the cylindrical inner wall 19 of the plenum chamber 13. To prevent motive fluid from bypassing the vanes 15 the static seal 25 is disposed between the adjacent cylindrical portions 19 and 23 of the turbine 1.

As shown in FIGS. 2 through 5 the static seal 25 comprises a plurality of arcuate segments 27 interconnected for form a circumferentially adjustable ring. A circumferential groove 29 is disposed in the inner cylindrical wall 19 of the plenum chamber 13. The groove 29 has a T-shaped cross section so shaped that the cross portion is thicker than the stem is long. The arcuate segments 27 have a generally rectangular shaped cross section with flanges 30 extending lengthwise adjacent the margins of the side which is adjacent the bottom of the groove 29.

The cylindrical wall 19 of the plenum chamber 13 is made in two sections, which are joined at a longitudinal seam, which is disposed in a horizontal plane passing through the axis of the rotor 9. The groove 29 accepts and retains the arcuate segments 27, the width of the arcuate segments is slightly less than the width of the stem of the T-shaped groove 27 and the flanges 30 of the arcuate segments slidably fit within the cross of the T-shaped groove so that when the sections of the inner wall 19 are joined together the arcuate segments 27 are captured within the groove 29, but can expand outwardly to form a seal with cylindrical surface 24.

Leaf springs 31 bias the arcuate segments 27 radially outwardly away from the bottom of the groove 29 and into engagement with a cylindrical surface 24 formed by the inner shroud 23 of the stationary vanes 15.

The arcuate segments 27 has a portion of the flange 30 removed adjacent the mid section. The blocks 33 having a generally U-shaped cross-section with arms 34 extending upwardy therefrom. The arms 34 are disposed to slidably engage the portion of the arcuate segments 27 having the flanges 30 removed preventing relative circumferential movement, while allowing radial movement therebetween.

The leaf springs 31 are bow-shaped and the mid section passes through the openings in the U-shaped blocks 33 and engage the inner surface the arcuate segments 27. The U-shaped blocks 33 are fastened to the inner wall 19 of the plenum chamber 13 by machine screws 35, which also pass through an opening 37 in the mid section of the bow-shaped leaf springs 31. The arcuate segments 27 also have a blind hole 39 adapted to accommodate the end of the screw 35. Ths, the blocks 33 are fixed with respect to the inner wall 19 of the plenum chamber 13 preventing circumferential movement of the arcuate segments 27 and leaf springs 31. The flanges 30 on the arcuate segments 27 are so disposed to form an inner arcuate groove 41, which is adapted to receive the leaf spring 31.

Figure 5:
FIG. 5 is a partial sectional view taken on lines V—V of FIG. 2.
Figure 4:
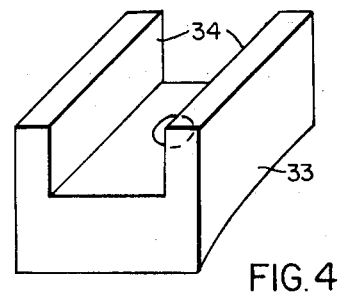
FIG. 4 is an enlarged perspective view of a block for the static seal.
Figure 2:
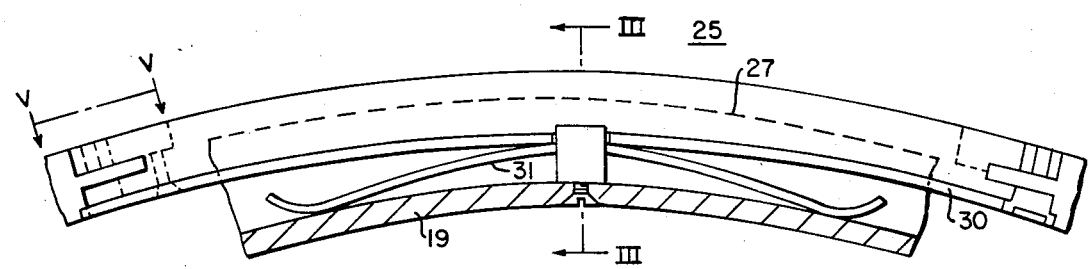
FIG. 2 is an enlarged partial sectional view taken on line II—II of FIG. 1.
Figure 3:
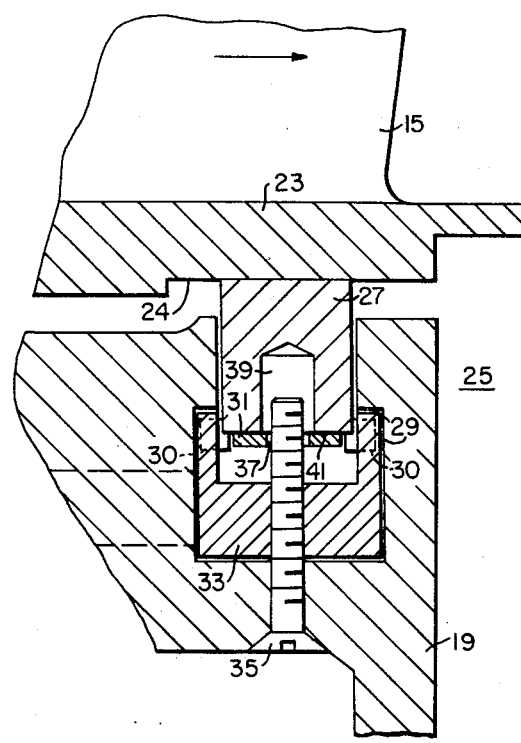
FIG. 3 is an enlarged partial sectional view taken on line III—III of FIG. 2.

As shown in FIG. 5 the ends of the arcuate segments 27 are cut on a bias, or at an oblique angle with respect to the circumferential axis of the arcuate segments. Each end of the arcuate segment 27 contains a mortise groove 43 which registers with a mortise groove of the adjacent arcuate segment and a bar 45 forming a tenon is disposed in the mortise groove and fastened to one arcuate segment and is slidably disposed in the mortise groove of the adjacent arcuate segment producing a radially adjustable seal ring.

The static seal 25, as hereinbefore described, is advantageously radially adjustable to compensate for out of roundness and eccentricity of the inner shroud of the stationary vanes and the inner wall of the plenum chamber, accommodate radial and axial differential thermal expansion and contraction; the parts are simple and captive within the groove 29 so that they will not become disengaged and damage the turbine, and they form a seal, which functions effectively at high temperatures.

What is claimed is:

1. A static seal for controlling leakage of fluid between high and low pressure portions of an elastic fluid machine, said seal comprising a generally cylindrical surface, a plurality of arcuate segments cooperatively associated to form a circumferentially adjustable ring, a circumferential groove adapted to receive and retain said arcuate segments, bias means associated with each arcuate segment and so disposed to bias the arcuate segments in a radial direction away from the bottom of said circumferential grooves, and a holding block and fastening means for each arcuate segment, said holding block cooperating with the fastening eans and the arcuate segments to hold the arcuate segments and the bias means in a fixed circumferential position with respect to the circumferential groove and to allow the arcuate segments to move radially to a limited degree to permit said arcuate segments to contact said cylindrical surface and form a seal therebetween.

2. A static seal as set forth in claim 1, wherein the groove has a T-shaped cross section.

3. A static seal as set forth in claim 1, wherein the groove has a T-shaped cross-section and the cross of the T is thicker than the stem is long.

4. A static seal as set forth in claim 1, wherein the arcuate segments have a generally rectangular shaped cross section with flanges extending lengthwise adjacent the margins of the side which is adjacent the bottom of the groove.

5. A static seal as set forth in claim 4, wherein the flanges are removed adjacent the mid section of the arcuate segments and the blocks have a generally U-shaped cross-section with arms that are adapted to engage the portion of the arcuate segment having the flanges removed to prevent relative circumferential movement and allow relative radial movement.

6. A static seal as set forth in claim 5, wherein fastening means fasten the block to that portion of the turbine in which the groove is formed and engage the biasing means preventing circumferential movement thereof.

7. A static seal as set forth in claim 1, wherein the arcuate segments have a generally rectangular shaped cross section with flanges extending lengthwise adjacent the margins of the side which is adjacent the bottom of the groove; the flanges are removed adjacent the mid section thereof; the blocks have a generally U-shaped cross section with arms adapted to engage the mid section of the arcuate segment, which has the flanges removed; the groove has a T-shaped cross section; the blocks are slidably disposed within the cross portion of the T-shaped groove; and the fastening means fasten the blocks to the portion of the turbine in which the groove is formed.

* * * * *